United States Patent Office 3,490,395
Patented Jan. 20, 1970

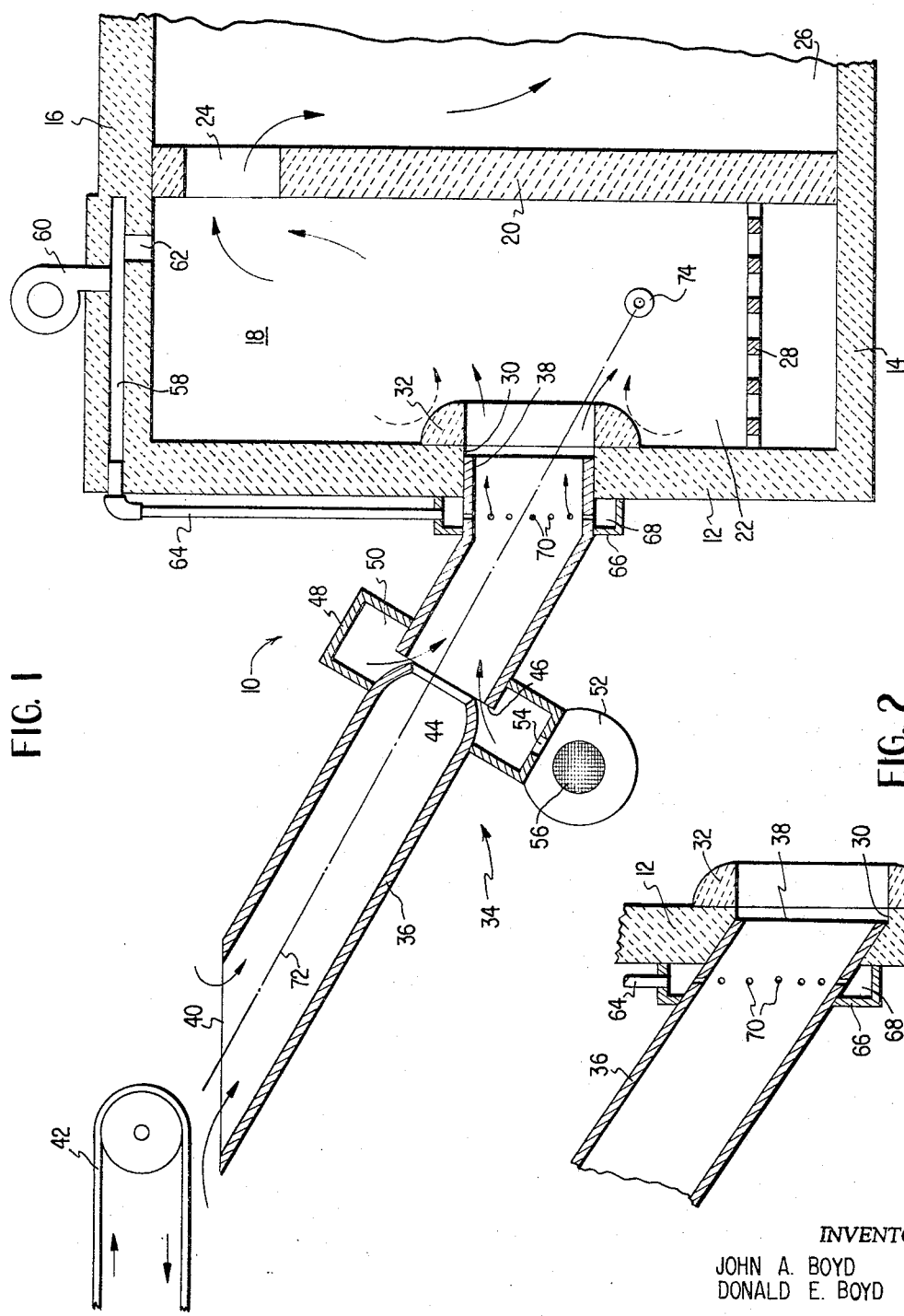

3,490,395
METHOD AND APPARATUS FOR INCINERATING THERMOPLASTIC MATERIALS
John A. Boyd, Fairfax, and Donald E. Boyd, Clifton, Va., assignors to Washington Incinerator Sales & Service, Inc., Alexandria, Va., a corporation of the District of Columbia
Filed May 21, 1968, Ser. No. 730,880
Int. Cl. F23d 19/00; F23g 5/00
U.S. Cl. 110—18                                    10 Claims

ABSTRACT OF THE DISCLOSURE

An improved incineration system for thermoplastic materials wherein a combustion chamber is provided with an inlet or charging port. A moving stream of air is generated outside the incineration combustion chamber and is directed toward and through the charging port into the interior of the combustion chamber. The thermoplastic materials to be incinerated are introduced into the air stream at a location remote from the charging port and are conveyed along and upported by the air stream and are thus introduced through the charging port into the combustion chamber where they are burned. By using the air stream for supporting and conveying the thermoplastic materials, such materials are maintained out of contact with the elevated temperature portions, of the incinerator itself and hints will not melt and stick to surfaces of the incinerator. Instead, the thermoplastic materials will be carried into the central portion of the combustion chamber where they are to be burned, and the air stream which carries the thermoplastic materials additionally creates turbulent flow conditions within the combustion chamber to promote and facilitate burning of the materials.

---

This invention relates to incineration equipment and processes and more particularly it relates to a method and apparatus for efficiently incinerating thermoplastic materials.

In known and conventional type of incinerators, there is provided a combustion chamber means having a burner means therein, with an inlet opening or charging port being provided for introducing to the combustion chamber, the materials which are to be burned. In some instances, the charging port is normally closed by a door means which must be manually opened in order to introduce the refuse or other material to be burned into the combustion chamber. However, in continuous feed types of incinerators, the door to the combustion chamber is often left open for extended periods of time or eliminated entirely. Some times, in installations of this type, heat resistant belt type conveyors are used to feed the materials to be burned to and through the open charging port.

Such known and existing types of incineration apparatus do not, however, perform entirely satisfactorily in the burning of thermoplastic materials. Materials of this type will become progressively softer, stickier and more viscous as the surrounding temperature becomes elevated, and as a result, it is extremely difficult to feed these materials into the normal incinerator. If the materials are fed by a conventional conveyor, the heat emitting from the charging port of the incinerator can very likely melt or otherwise soften a portion of the thermoplastic materials, thereby causing the same to "stick" to the conveyor. This situation is true in the case of a belt type conveyor, and it is also true in the case of a chute type conveyor, since, very often, the chute type conveyor will itself become elevated in temperature and thus cause the thermoplastic material to stick directly to the chute.

With the foregoing in mind, it is an object of the present invention to provide a method and apparatus which enables thermoplastic materials to be efficiently burned by an incineration apparatus, without such thermoplastic materials becoming stuck or adhered to various portions of the incineration apparatus, thereby fouling the same.

Another object of the present invention is to provide a new and improved method and means for conveying thermoplastic materials into an incinerator apparatus in such a manner that the materials do not stick or adhere to any portions of the incinerator and additionally, to provide a method and means wherein the actual burning of the thermoplastic materials within the incinerator is enhanced and promoted.

Another object of the present invention is to provide a simple, yet efficient, method and means for guiding and supporting thermoplastic materials while covering the same into an incineration apparatus, such guiding, supporting and conveying also serving to maintain such thermoplastic materials out of contact with elevated temperature portions of the incineration apparatus.

Other objects, advantages and salient features of the present invention will become apparent from the following detailed description, which, taken in conjunction with the annexed drawings, discloses a preferred embodiment thereof.

Referring to the drawings, which form a part of the specification:

FIG. 1 is a diagrammatic sectional view of an apparatus in accordance with the principles of the present invention; and FIG. 2 is a fragmentary sectional view showing a modified portion of the apparatus of FIG. 1.

Referring now to the drawings, there is shown in FIG. 1 an incineration apparatus generally designed 10, such apparatus including a front wall 12, a base wall 14, a top wall 16, and a pair of opposed side walls 18, only one of which is shown in the drawings. An intermediate wall 20 extends between the base wall 14 and the top wall 16 in spaced relation rearwardly from the front wall 12 and the area therebetween thus serves to set off and define a primary combustion chamber 22. Preferably, all of the walls are fabricated of firebrick or some other suitable heat resistant material. Near its upper end, the wall 20 is provided with an opening 24 which permits the combustion gases and other combustion products to flow from the primary combustion chamber 22 to a secondary combustion chamber 26 disposed therebehind. A grate 28 is provided near the bottom of the primary combustion chamber 22 and a clean-outdoor, not shown, can be provided at the bottom of one of the walls forming the primary combustion chamber so that ashes or other residue can be collected periodically from the grate 28.

The front wall 12 to the primary combustion chamber is provided with an inlet opening or charging port 30 through which materials to be burned can be introduced into the primary combustion chamber 22. Within the chamber itself, the charging port 30 is surrounded by a heat resistant deflector means 32 having an arcuate configuration as illustrated in FIG. 1. This arcuate configuration directs the heat and gas flow away from the charging port 30 as shown by the dashed line arrows in FIG. 1.

There is also provided a means generally designated 34 for feeding materials to the primary combustion chamber, and this means 34 can be considered as forming a part of the overall incinerator apparatus 10. In the illustrative form of feeding means 34 illustrated in FIG. 1, an elongated tubular conduit 36 is provided at an angle of approximately 30° to the horizontal. The tubular conduit 36 can be formed as a steel tube with a porcelain enamel coating on both the interior and exterior surface thereof. The lower end of the tube, designated 38, fits into the charging port 30 of the incinerator. The opposite or upper end of the tube, designated 40, is open and is disposed at a location remote from the charging port. A suitable auxiliary feeding device, such as a belt conveyor 42, can be utilized to deposit the materials to be incinerated into the open end 40 of the tube 36.

At some location intermediate the ends 38 and 40, the tube is provided with a venturi or throat 44 of a reduced diameter. Immediately adjacent the throat 44, the tube is provided with some form of annular slot means 46 which opens between the interior and exterior of the tube. An annular body 48 is attached to the exterior of the tube at both the upstream and downstream sides of the venturi 44 and opening 46 and as a result, the interior of the annular means 48 defines an annular chamber 50 surrounding the slot or groove 46. A suitable fan or blower means 52 is attached to the annular body 48 and communicates with the chamber 50 through an opening 54. The fan or blower 52 is provided with an intake opening or screen 56 so that as the fan operates, air is drawn through the intake and passed through the opening 54 into the annular chamber 50 and from there, through the slot or groove 46, and into the interior of the tube 36 in a downstream direction toward the charging port as indicated by the arrows in FIG. 1. Also, due to the fact that air is being introduced into the tube adjacent the venturi portion 44, there is a suction effect produced at the upper or open end 40 of the tube, which also tends to draw air inwardly into the tube and toward the charging port.

A preheated air feeding device is also provided as a part of the incineration apparatus 10, such preheated air apparatus being similar to that disclosed in our copending application Ser. No. 707,560 filed Feb. 23, 1968. Specifically, there is disclosed in such copending application and herein, a chamber or passage 58 in the top wall of the primary combustion chamber 22. A suitable fan or blower device 60 is mounted upon the top wall above the primary combustion chamber and its nozzle communicates with the passage 58. Also, an opening 62 is provided between the passage 58 and the primary combustion chamber 22, with the opening 62 being disposed adjacent the opening 24 which communicates between the primary and secondary combustion chambers. A conduit 64 connects from the passage 58 to a hood or other annular chamber forming means 66 surrounding the pipe 36 adjacent the charging port 30 of the incinerator. An annular chamber 68 is formed within the hood 66 and a series of small apertures 70 are formed in the walls of the conduit or pipe 36 to communicate with the chamber 68. As such, at least a portion of the air provided by the blower 60 traverses through the passage 58 and is preheated, due to the heat of combustion from the primary combustion chamber 22. This preheated air then passes through the conduit 64 into the annular chamber 68, then through the aperture 70 to flow into the interior of the pipe and through the charging port.

The overall effect of the fans and blowers 52 and 60 and their manner of connection with the apparatus hereof, serve to provide a means for generating a positively directed air stream through the pipe 36 and into the interior of the combustion chamber 22. The effective axis or directed air path can be designated 72, as shown in FIG. 1, and this path extends directly through the pipe 36 into the interior of the combustion chamber. One or more burners 74 are provided in the primary combustion chamber, preferably mounted in the side walls 18 thereof, and the burners are directed at substantially 90° to the axis 72.

The thermoplastic materials to be incinerated are deposited into the upper end 40 of the tube 36. Such deposition would be accomplished by means of the conveyor belt 42 in the illustrated embodiment, although the same could readily be accomplished manually or through some form of gravity chute. The thermoplastic materials themselves can be in any one of a different form. Such materials could, for example, be in the form of shaped articles such as styrene cups or utensils. Also, such materials such as be in the form of small discrete items, such as pellets or scraps formed from a manufacturing operation. Alternatively, such materials could be supplied in continuous strip form, such as photographic film or the like.

In any event, regardless of what type of thermoplastic materials are introduced into the open end 40 of the tube, or regardless of how the same are actually introduced thereinto, the overall result is that when such materials enter the tube, they are contained within the moving air stream traversing through the tube and into the primary combustion chamber. Due to the fact that the tube is disposed at a somewhat downward angular inclination, the effective gravitational forces will act in the same direction as the air flow movement and the two forces will increase the velocity of the materials toward the charging port. However, the air flow movement through the tube will considerably exceed the gravitational force movement which would be encountered and will hence tend to convey the materials, entrained or supported in the air stream, from the open end 40 toward and through the venturi throat 44. There is a substantially increased air flow in the area between the venturi throat 44 and the charging port 30, created by the air supplied from the annular chambers 50 and 68 and this air flow also serves to support and convey the thermoplastic materials so that the same are carired through the charging port and into the interior of the primary combustion chamber 22. These air forces are directed primarily along the walls of the tube 36, at least between the area of the venturi 44 and the charging port, and as a result, the thermoplastic materials are prevented from contacting the walls of the tube which will ordinarily be at some elevated temperature. Also, the very fact that the air flow itself traverses along the walls of the tube serves to reduce this temperature over what it would normally be, if there were no air flow through the tube. Finally, the very fact that the air stream is injected into the primary combustion chamber serves to greatly promote, facilitate and enhance burning and combustion of the thermoplastic materials within the combustion chamber. Some thermoplastic materials, such as styrene, ordinarily burn rather poorly, but their burning qualities can be considerably enhanced by the addition of extra oxygen, as is supplied when the air stream is injected into the primary combustion chamber. Finally, the presence of the air stream in the primary combustion chamber serves to create turbulent flow conditions which keep the materials moving in the primary combustion chamber as they are burned by the burners 74, thereby assuring a relatively complete combustion of the materials within the primary combustion chamber. The combustion gases are then directed upwardly through the primary combustion chamber and pass through the opening 24 into the secondary combustion chamber 26. It will also be remembered that at least that portion of the air supplied t othe chamber 68 and thus through the openings or apertures 70 will be in a preheated condition, so that as the same passes back into the primary combustion chamber, it will be preheated turbulent air acting upon the materials to be burned. As aforementiioned, the curved deflectors 32 surrounding the charging port on the interior of the combustion chamber serve to direct the heat away from the charging port and back into the interior of the combustion.

The sole difference between the embodiment shown in FIG. 1 and that shown in FIG. 2 resides in the configuration of the lower end 30 of the feed tube. In FIG. 1, the feed tube is bent slightly at its end to feed straight into the charging port whereas in FIG. 2, the end feeds into the charging port at the same angle of disposition as the remainder of the tube. Either embodiment can be used with satisfactory results, since, in both, the air flow is sufficient to prevent the thermoplastic materials feeding through the tube from contacting the walls thereof.

To understand and appreciate the significance of the present invention, one must understand what would occur if the materials were merely fed through a solid tube or chute such as the tube 36, without the use of any directed air stream. Since the interior of the primary combustion chamber 22 is at elevated temperatures, due to the burning which occurs therein, a certain amount of the heat therefrom will emit through the charging port 30 and, through convection and radiation, will serve to elevate the temperatures of the feeding tube or chute. Also, since the lower end of the feeding tube or chute is customarily connected with the charging port, either directly or operatively, there will be a certain amount of conduction which occurs along the walls of the feeding tube or chute. In any event, it will be understood, that after the apparatus has been in operation for even a short period of time, the walls of the feeding tube or chute will become considerably elevated in temperature. Then, if thermoplastic materials are being introduced through the tube or chute, such materials will tend to reach their plastic state as they contact these elevated temperature walls and will hence tend to "stick" or adhere to the walls of the tube adjacent the charging port or at some point further remote therefrom. As the heat continues, these materials would thus tend to melt and become more viscous and runny, and thus as further new materials were passed through the tube or chute, they would contact this viscous mass and would stick thereto. Thus, in such a construction, as is the case with most prior art in conventional constructions, after the apparatus has been run for a short period of time, the feeding chute or tube becomes clogged with a viscous mass of partially decomposed, but not fully burned, plastic materials which tend to prevent feeding directly into the primary combustion chamber. At this point, it becomes necessary to manually or otherwise remove these clogging and viscous plastic materials, and often, it is necessary to disassemble the entire unit to accomplish this result, or even to shut down the incinerator itself.

In contrast with these prior art arrangements, the present invention utilizes a moving air stream which traverses through the tube 36 and which performs several different functions. First of all, such moving air stream serves as a means for facilitatiing conveying of the thermoplastic materials from their remote location of introduction into the interior of the combustion chamber. Secondly, the moving air stream is, at least in that portion of the feeding tube, between the venturi throat and the charging port, directed along the walls of the feed tube and thus serves to prevent the thermoplastic materials from contacting such walls which are at elevated temperatures. Thirdly, the air stream itself tends to reduce the temperature of the walls to the feeding tube by air flow therealong, and finally, the air stream is introduced into the primary combustion chamber and serves to support and promote combustion therein as well as to create a turbulent flow which assures complete combustion of the thermoplastic materials by the burner 74. Thus, in effect, the moving air stream serves to assure that the thermoplastic materials will be rapidly and efficiently conveyed along the feed axis 72 and into the interior of the primary combustion chamber, and also serves to assure that such materials will not contact any elevated temperature portions of the incineration apparatus outside of the primary combustion chamber, where undesired sticking or clogging could occur.

After reading the foregoing detailed description, it should be apparent that the objects set forth at the outset of the specification have been successfully achieved by the present invention. However, since the foregoing detailed description was merely directed to a preferred embodiment of the present invention, it will be apparent that various modifications and changes apparent to those skilled in the art may be made without departing from the spirit and scope of the invention, as defined in the appended claims.

What is claimed is:

1. A method for incinerating thermoplastic materials, which comprises:
   providing a combustion chamber means having a charging port;
   generating a moving air stream directed toward and through said charging port;
   introducing thermoplastic materials into said moving air stream at a location remote from said charging port;
   supporting said thermoplastic materials within said moving air stream to thereby convey said materials from said remote location to and through said charging port and into said combustion chamber; and
   permitting said air stream to flow turbulently within said combustion chamber; and
   directing a flame into said combustion chamber to incinerate said thermoplastic materials therewithin, said incineration being promoted and facilitated by said turbulent air flow.

2. A method as defined in claim 1 further including the step of confining said generated air stream to a preselected feed path.

3. A method as defined in claim 1 wherein said moving air stream is directed along a linear feed path and wherein said flame is directed substantially perpendicularly to said linear feed path.

4. In an incinerator apparatus for destruction of thermoplastic materials, the improvement which comprises
   primary combustion chamber means;
   burning means for burning said thermoplastic materials within said primary combustion chamber means;
   said primary combustion chamber means including a charging port through which said thermoplastic materials can be introduced;
   means generating a moving air stream directed toward and through said charging port; and
   means for introducing said thermoplastic materials into said moving air stream at a location remote from said charging pert;
   said moving air stream being operative to convey said thermoplastic materials from said remote location to and through said charging port and into said primary combustion chamber means for combustion by said burning means;
   said moving air stream also serving to substantially support said thermoplastic materials during conveying and to maintain said materials out of contact with portions of said incinerator apparatus which are elevated in temperature;
   said moving air stream within said primary combustion chamber means creating a turbulent flow to promote combustion of said thermoplastic materials.

5. The improvement defined in claim 4 further including means confining said moving air stream to a preselected feed path.

6. The improvement defined in claim 5 wherein said burning means is situated so that the burning flame therefrom is substantially perpendicular to said preselected feed path.

7. The improvement defined in claim 5 wherein said means confining said moving air stream is a tubular conduit having one end coupled to said primary combustion chamber means at said charging port and having the other end at said remote location.

8. The improvement defined in claim 7 wherein said conduit includes a venturi between said ends thereof and wherein said means for generating a moving air stream includes a blower which injects air into said conduit adjacent said venturi.

9. The improvement defined in claim 8 wherein said means for generating a moving air stream further includes:
  means defining a chamber surrounding said one end of said conduit,
  aperture means through said conduit to establish communication between said chamber and the interior of said conduit; and
  means for supplying preheated air to said chamber.

10. The improvement defined in claim 9 wherein said means for supplying preheated air includes a passage adjacent at least one of the walls of said primary combustion chamber means and blower means for forcing air through said passage and into said chamber, whereby the heat from said combustion chamber will preheat the air as it traverses said passage.

References Cited

UNITED STATES PATENTS

| | | | |
|---|---|---|---|
| 2,702,013 | 2/1955 | Atteberry | 110—18 |
| 3,050,202 | 8/1962 | Funk | 110—7 |
| 3,200,777 | 8/1965 | McIntire | 110—18 |

KENNETH W. SPRAGUE, Primary Examiner

U.S. Cl. X.R.

110—22